United States Patent [19]
Cucheran

[11] Patent Number: 5,273,195
[45] Date of Patent: Dec. 28, 1993

[54] ADJUSTABLE CROSS RAIL FOR A VEHICLE ARTICLE CARRIER

[75] Inventor: John S. Cucheran, Lake Orion, Mich.

[73] Assignee: John A. Bott, Grosse Pointe Farms, Mich.

[21] Appl. No.: 966,260

[22] Filed: Oct. 26, 1992

[51] Int. Cl.[5] ................................................ B60R 9/00
[52] U.S. Cl. .................................. 224/316; 224/321; 224/326
[58] Field of Search ............... 224/309, 310, 314, 316, 224/320, 321, 325, 326, 329

[56] References Cited

U.S. PATENT DOCUMENTS

| | | |
|---|---|---|
| 3,165,353 | 1/1965 | Weise . |
| 4,133,465 | 1/1979 | Bott .................................... 224/326 |
| 4,501,385 | 2/1985 | Bott . |
| 4,673,119 | 6/1987 | Bott . |
| 4,768,691 | 9/1988 | Stapleton ........................... 224/325 |
| 5,069,377 | 12/1991 | Baughman . |
| 5,096,106 | 3/1992 | Foster et al. . |

Primary Examiner—Linda J. Sholl
Attorney, Agent, or Firm—Harness, Dickey & Pierce

[57] ABSTRACT

A vehicle article carrier having an adjustable cross rail. The vehicle article carrier includes a pair of side rails positioned longitudinally along an outer body surface of a vehicle such as a roof. The side rails each include a side rail member and a pair of brackets secured fixedly to the side rail member at opposite ends of the side rail member. The brackets are further fixedly secured to the outer body surface. Each of the side rail members and selected pair of the brackets include channels formed therein in communication with each other. A cross rail is positioned perpendicularly between the channels and is movable slidably between an operative position between the side rial members, elevationally above the outer body surface, and a stored position between the selected pair of brackets closely adjacent the outer body surface. In the stored position the cross rail offers minimal wind resistance and generates minimal wind noise even when the vehicle is traveling at relatively high speeds. A thumbwheel is disposed within the cross rial and operatively connected to a threaded shaft and locking nut to enable the cross rail to be manually, releasably secured at desired positions along the side rail members and the pair of brackets.

9 Claims, 2 Drawing Sheets

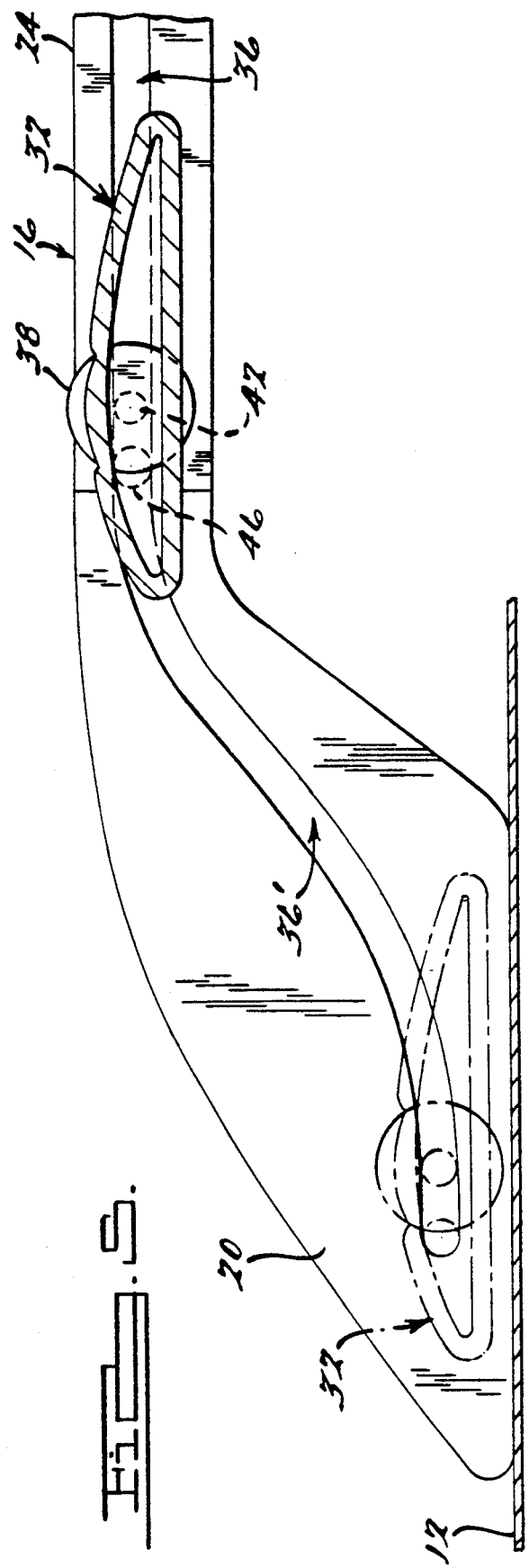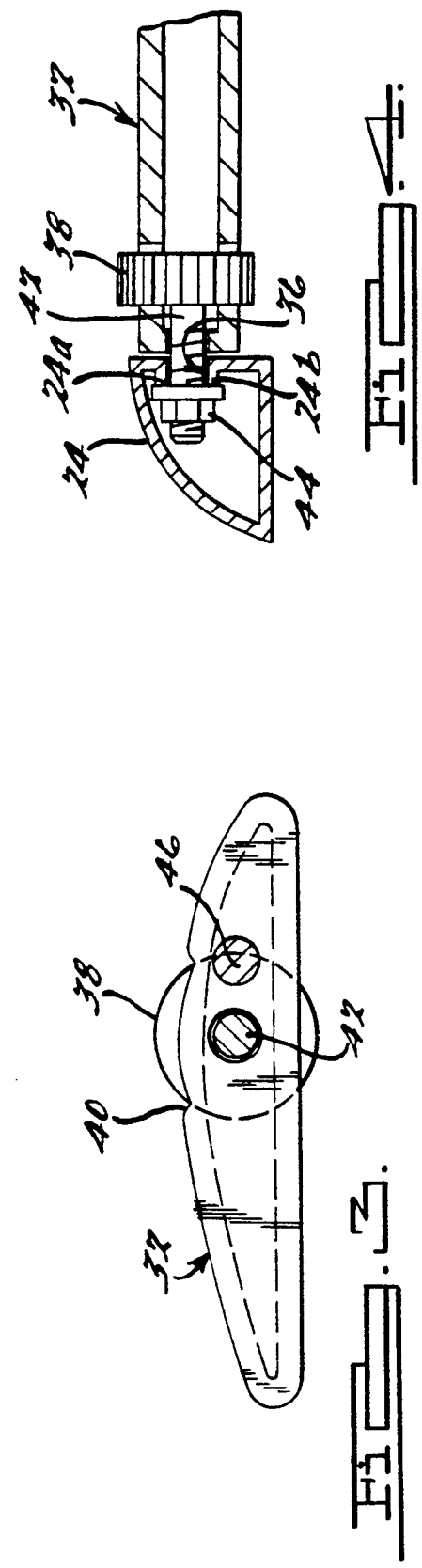

ADJUSTABLE CROSS RAIL FOR A VEHICLE ARTICLE CARRIER

TECHNICAL FIELD

The present invention is related to vehicle article carriers for removably securing cargo elevationally above an outer body surface of a vehicle, and more particularly to a vehicle article carrier incorporating side rails and bracket members including channels formed therein which enable a cross rail to be placed in a stored position closely adjacent the outer body vehicle surface when the vehicle article carrier is not in use.

DISCUSSION

Vehicle articles are used in a wide variety of applications to secure cargo removably and elevationally above an outer body surface of a vehicle when using the vehicle to transport the cargo. Such carriers typically include a pair of side rails placed parallel with each other which extend longitudinally along and above the outer body surface (i.e., roof) of the vehicle. A plurality of brackets at terminal ends of each of the side rails may be secured to the outer body surface of the vehicle to help support the side rails elevationally above the outer body surface. At least one cross rail typically extends perpendicularly between the side rails to provide a means by which cargo may supported removably thereon so as not to damage the outer body surface. Frequently, at least one of the cross rails is adjustable to enable it to be placed longitudinally at various positions along the side rails.

It is an important consideration that the cross sectional shape of the cross rail, or cross rails, of a vehicle article carrier system be shaped in an aerodynamic manner to reduce as much as possible any unnecessary wind noise and/or wind drag which may be present when the cross rail(s) are secured between the side rails and no load is being supported thereon. An aerodynamic shape helps to reduce any unnecessary wind noise and/or wind drag which might be occasioned when the cross rails are in position between the side rails and no load is being transported on the cross rails.

While providing an aerodynamic shape for each cross rail of a vehicle article carrier system helps significantly to reduce wind noise and/or wind drag, it would be highly desirable if any such wind noise or wind drag could be even further reduced when the vehicle article carrier is not being used to support cargo thereon. More specifically, it would be highly advantageous if one or more of the cross rails of the vehicle article carrier system was capable of being positioned closely adjacent the outer body vehicle surface when the vehicle article carrier is not in use.

Accordingly, it is a principal object of the present invention to provide a vehicle article carrier having a cross rail which may be positioned closely adjacent the outer body surface of a vehicle, such as a roof of a vehicle, to thereby significantly reduce or eliminate wind drag and wind noise which would otherwise be generated when the cross rail is in its elevated position above the outer body surface, ready for use, but not being used.

It is yet another object of the present invention to provide a vehicle article carrier having an adjustable cross rail which may be quickly and easily manually locked in either a stored position, wherein it is positioned closely adjacent an outer body vehicle surface such as a roof, or in an elevated position ready to support cargo thereon.

It is yet another object of the present invention to provide a vehicle article carrier having an adjustable cross rail which is aerodynamically shaped to further reduce wind noise and wind drag whether the cross rail is in an elevated position ready for use, or in a stored position disposed closely adjacent an outer body surface of a vehicle.

SUMMARY OF THE INVENTION

The above and other objects are provided by a vehicle article carrier having an adjustable cross rail in accordance with a preferred embodiment of the present invention. The vehicle article carrier generally includes a pair of side rails which are disposed longitudinally and parallel to each other along an outer body vehicle surface such as a roof of a vehicle. Each of the side rails generally include at least one bracket and one side rail member which are secured together, and which further each include means forming a channel therein. In the preferred embodiment the means for forming a channel provides a longitudinally continuous channel which extends along the side rail member and bracket portions of the side rails. A cross rail is disposed perpendicularly between the side rails and includes means for engaging the channels formed in each of the side rails. The cross rail further includes locking means for releasably securing the cross rail at desired positions along the side rails.

The channels formed in the bracket portions of each of the side rails preferably slopes downwardly to a position closely adjacent the outer body surface of the vehicle. Accordingly, the cross rail may be slidably moved throughout the channels formed in each of the side rails to a "stored" position closely adjacent the outer body vehicle surface when the cross rail is not in use. The ability to position the cross rail in the stored position significantly reduces or eliminates wind noise and wind drag which might be experienced if the cross rail remained positioned at various locations along the side rail members.

When it is desired to use the vehicle article carrier to transport cargo, the cross rail may be moved from its stored position closely adjacent the outer body surface along the channels formed in each of the side rails to a more elevated position extending between the side rail members. Cargo can then be placed on the cross rail and supported elevationally above the outer body surface.

In the preferred embodiment the cross rail further includes locking means for releasably securing the cross rail at any desired location along the channels formed in the side rails. Accordingly, the cross rail may be releasably secured in its stored position closely adjacent the outer body vehicle surface or elevationally above the outer body vehicle surface at virtually any point along the length of the side rail members or bracket portions. The locking means is further manually engageable so as not to require any special or conventional tools to secure or release the cross rail at a desired position. By enabling the cross rail to be positioned at a point closely adjacent the outer body vehicle surface, wind noise and wind drag which might otherwise be experienced when the cross rail is positioned elevationally above the outer body vehicle surface at some point along the side rail members is significantly reduced or eliminated.

BRIEF DESCRIPTION OF THE DRAWINGS

The various advantages of the present invention will become apparent to one skilled in the art by reading the following specification and subjoined claims and by referencing the following drawings in which:

FIG. 3 is an end view of the cross rail of FIG. 2 taken in accordance with section line 3—3;

FIG. 4 is a cross sectional view of the cross rail of FIG. 2 releasably coupled to the side rail of FIG. 2 and taken in accordance with section line 4—4 of FIG. 2; and FIG. 5 is an end view of the cross rail of FIG. 2 taken in accordance with directional arrow 5 in FIG. 2 showing the cross rail in elevation in its elevated position above the outer body vehicle surface and in phantom in its store position disposed closely adjacent the outer body vehicle surface.

DETAILED DESCRIPTION OF THE PREFERRED EMBODIMENT

Figure 1:
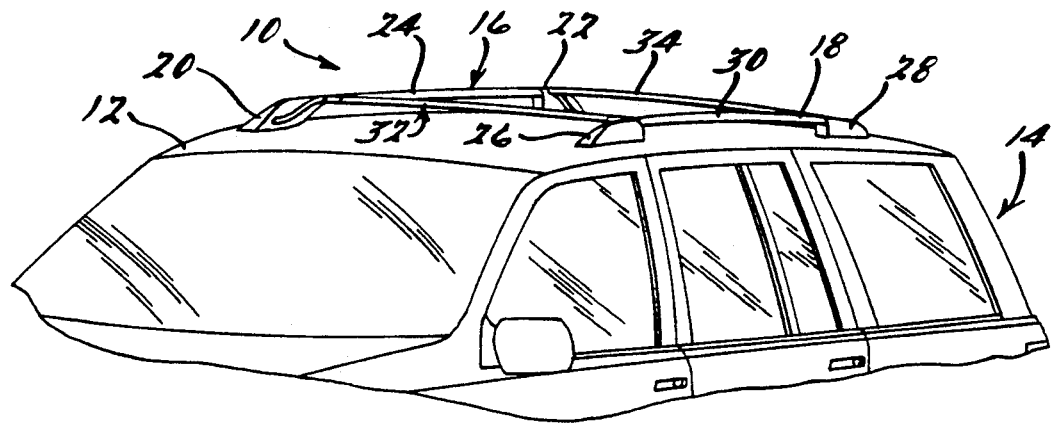
FIG. 1 is a perspective view of a vehicle article carrier including an adjustable cross rail in accordance with a preferred embodiment of the present invention.

Referring to FIG. 1, there is shown a vehicle article carrier 10 in accordance with a preferred embodiment of the present invention secured to an outer body vehicle surface 12, in this instance a roof, of a vehicle 14. The vehicle article carrier 10 includes a pair of side rails 16 and 18 which are disposed parallel to each other and longitudinally along the outer body vehicle surface 12.

Side rail 16 is comprised of bracket portions 20 and 22 and a side rail member 24 secured fixedly therebetween. The bracket portions 20 and 22 are further fixedly secured to the outer body vehicle surface 12. Side rail 18 is similarly comprised of a pair of bracket portions 26 and 28 and a side rail member 30 secured fixedly therebetween, with bracket portions 26 and 28 being fixedly secured to the outer body vehicle surface 12. Secured releasably between the side rails 16 and 18 is an adjustable cross rail 32 which is disposed perpendicularly between the side rails 16 and 18 and generally parallel to the outer body vehicle surface 12. A fixed cross rail 34 is fixedly disposed between bracket portions 22 and 28, although it should be appreciated that fixed cross rail 34 could instead be an adjustable cross rail positioned between the side rails 16 and 18 if so desired. It will be appreciated that the side rails 16 and 18 are preferably identical in construction. Thus, for discussion purposes, only side rail 16 will be described in detail, with it being understood that the construction of side rail 18 is identical and complementary.

Figure 2:
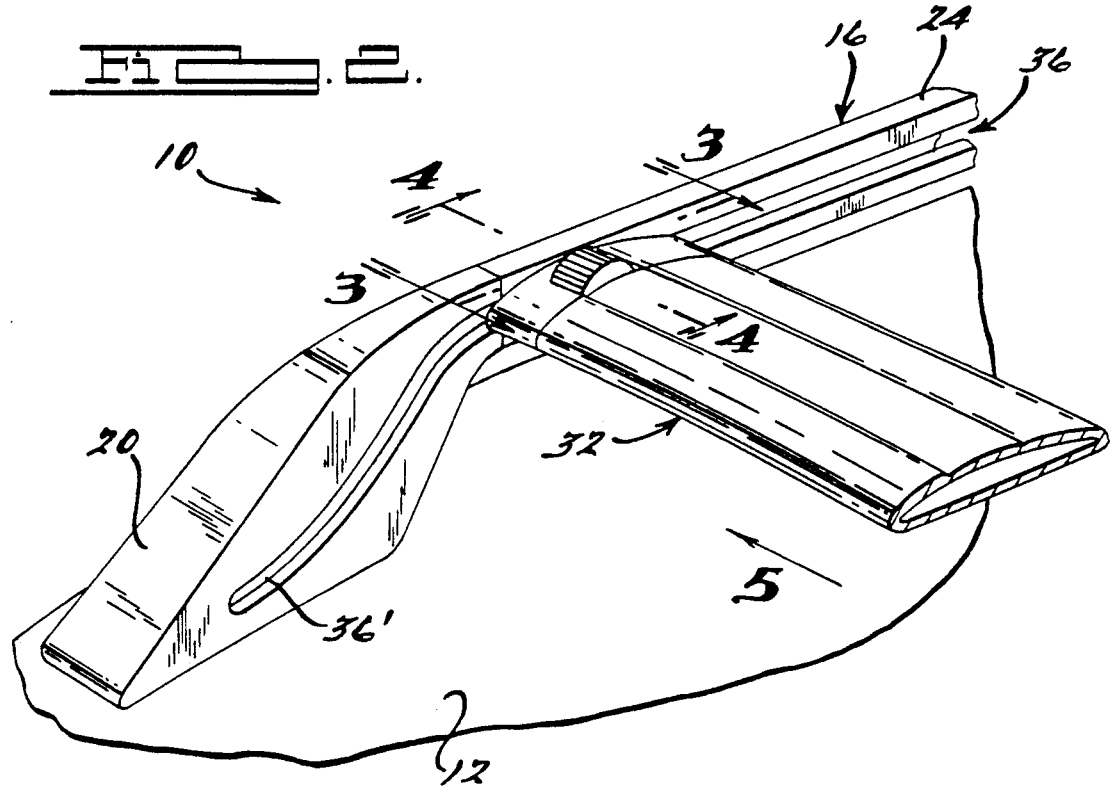
FIG. 2 is a fragmentary, perspective view of a portion of one of the side rails shown in FIG. 1 and a portion of the adjustable cross rail.

Referring to FIG. 2, a portion of the side rail 16 and a portion of the adjustable cross rail 32 are shown with the cross rail 32 releasably secured to the side rail 16. The side rail member 24 includes a channel 36 formed longitudinally therein and extending preferably the entire length of the side rail member 24. The bracket portion 20 similarly includes a channel 36'. Channel 36' slopes very gradually downwardly to a position closely adjacent the outer body vehicle surface 12, and at its opposite end is longitudinally aligned with and in communication with channel 36 to form a single, continuous, longitudinally extending channel between the bracket portion 20 and the side rail member 24. The cross rail 32 is preferably aerodynamically shaped in the form of an air foil to further help significantly reduce wind drag and wind noise which might otherwise be present when the cross rail 32 is in its elevated position as shown in FIG. 2.

It is a principal object of the present invention that the cross rail 32 can be adjustably positioned in its elevated position, as shown in FIG. 2, or moved slidably in accordance with the path defined by channels 36 and 36' of side rail member 24 and bracket portion 20, respectively, to a position closely adjacent the outer body vehicle surface 12 when the cross rail 32 is not in use. Accordingly, the cross rail 32 of the vehicle article carrier 10 has both an operative position, such as shown in FIG. 2, where the cross rail 32 is positioned elevationally well above the outer body vehicle surface 12 at any point along channel 36, and therefore capable of supporting cargo thereon clearly above the outer body vehicle surface 12, as well as a "stored" position. In the stored position the cross rail 32 is manually moved in accordance with the path defined by channel 36' to a position closely adjacent the outer body vehicle surface 12. When placed at the lowermost portion of channel 36', the cross rail 32 offers very little resistance to wind, and thus generates only an extremely small amount of wind drag and wind noise when the vehicle 14 is travelling.

Referring now to FIGS. 3 and 4, the structure of the cross rail 32 can be seen more clearly. The cross rail 32 includes releasable locking means in the form of a rotatable thumbwheel 38 which is mounted for rotational movement within a cut-out 40 of the cross rail 32. The thumbwheel 38 includes a threaded shaft 42 which is securely fixed to the thumbwheel 38 so that movement of the thumbwheel 38 causes a corresponding rotation of the threaded shaft 42. The threaded shaft 42 extends through a locking nut 44 (FIG. 4) disposed within channel 36. The channels 36 and 36' have sufficient area to enable the locking nut 44 to move freely therewithin along the side rail member 24 and bracket portion 20, or between its operative and stored positions. It will also be appreciated that the opposite end of the cross rail 32 preferably includes a thumbwheel, threaded shaft and locking nut identical to that described above for releasably securing the opposite end of the cross rail 32 to side rail 18.

In operation, when it is desired to releasably lock the cross rail 32 at a desired position along the side rail member 24, or in a stored position inbetween bracket portions 20 and 26, the thumbwheel 38 is rotated in a first direction to loosen the locking nut 44. This provides some clearance between the locking nut and the surfaces of the terminal ends 24a and 24b of the channel 36, thus enabling the cross rail 32 to be moved slidably along the side rail members 24 and 30 and bracket portions 22 and 26. When the cross rail 32 is positioned as desired, the thumbwheel 38 is rotated in the opposite direction to tighten the locking nut 44 against the terminal ends 24a and 24b of channel 36. The cross rail 32 will then be securely clamped at the desired position. It will also be appreciated that channel 36' is shaped identically in cross section to channel 36 to enable the threaded shaft 42 to move freely therewithin from channel 36.

With brief reference again to FIG. 3, the cross rail 32 further includes a post member 46 protruding outwardly therefrom to help maintain the cross rail 32 generally parallel to the outer body vehicle surface 12 when the cross rail 32 is in its operative or stored positions. It will be appreciated, however, that a wide variety of implements could be incorporated in lieu of post 46 to maintain the cross rail 32 generally parallel to the outer body vehicle surface 12. For example, a sleeve or shoulder portion may be incorporated at the outermost longitudinal end portions of the cross rail member 32 through which threaded shafts such as threaded shaft 42 may extend. Such sleeve or shoulder portions may further have a length which enables them to extend partially into the channels 36 and 36' to thereby help stabilize the cross rail 32 and prevent rotational movement of the cross rail 32 relative to the channels 36 and 36'. Thus, it will be appreciated by those of ordinary skill in the art that a wide variety of means may easily be incorporated to prevent the cross rail 32 from moving rotationally relative to the channels 36 and 36', and that the post member 46 is merely intended as a representative one of such means to stabilize the cross rail 32.

It will also be appreciated that the locking thumbwheel 38 and threaded shaft 42 could easily be substituted for a wide variety of locking mechanisms which will clampingly secure the cross rail 32 to the channels 36 and 36'. Examples of mechanisms which may be adapted for such use appear in the following U.S. patents, the disclosures of which are each hereby incorporated by reference:

| |
|---|
| 5,082,158 |
| 4,982,886 |
| 4,972,983 |
| 4,684,048 |
| 4,673,119 |
| 4,239,139 |
| 4,162,755 |
| 3,554,416 |

Referring to FIG. 5, the cross rail 32 can be seen in its operative and stored positions. In its operative position, as shown in elevation, the cross rail 32 is positioned along the side rail member 24. The cross rail 32 is also shown in phantom in its stored position closely adjacent the outer body vehicle surface 12. It will also be appreciated that the shape of channel 36', while being shown in FIG. 5 as curving very gradually, could be shaped to curve much more abruptly if desired for a particular application provided suitable structure such as a shoulder or sleeve portion circumscribing threaded shaft 42 is included in lieu of post 46 to enable the cross rail 32 to follow a more angled path than might be permitted by post 46.

As can further be seen in FIG. 5, when the cross rail 32 is in its stored position (as shown in phantom) it will offer minimal wind resistance and generate minimal wind noise when the vehicle 14 is travelling even at relatively high speeds such as those attained on a highway. It will also be appreciated that if alternative clamping means are used such as those disclosed in the above-referenced patents, which have heretofore been incorporated by reference, that the cross rail 32 may require no clearance between its lower surface and the outer body vehicle surface 12, and may therefore be able to rest directly against the outer body vehicle surface 12.

The cross rail 32, side rail member 24 and bracket portion 20 are all constructed of lightweight, rigid materials, and preferably of materials such as steel, plastic, or aluminum and may be constructed from one or more of a variety of conventional techniques such as stamping, roll forming or molding.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:
1. A vehicle article carrier comprising:
 a pair of laterally spaced apart side rails extending longitudinally relative to an outer body surface of a vehicle;
 each of said side rails including means for forming a channel therein extending longitudinally at least partially therealong;
 each side rail including means for forming a bracket adapted to be fixedly secured to said outer body surface to thereby help support said side rails elevationally above said outer body surface;
 each of said bracket means including a channel formed therein in communication with said channel of its associated side rail, said channels of each of said bracket means further extending along said bracket means to a position closely adjacent said outer body surface;
 cross rail means for supporting cargo extending perpendicularly between said side rails; and
 locking means operatively associated with said cross rail means and adapted to be disposed slidably at least partially within said channel of at least one said side rail and at least one said channel of one of said bracket means for enabling said cross rail means to be moved slidably along said at least one said side rail and said one of said bracket means and for enabling said cross rail means to be manually, fixedly secured at a desired position along said side rails;
 said channel of said at least one bracket means cooperating with said at least one channel of said at least one said side rail to enable said cross rail means and said locking means to be moved slidably along said at least one channel of said at least one said side rail and said one channel of said at least one bracket means into a position wherein a lower surface of said cross rail is positioned closely adjacent said outer body surface of said vehicle.

2. The vehicle article carrier of claim 1, wherein said locking means comprises a locking nut adapted to fit slidably within said one channel of said at least one bracket means and said at least one channel of said at least one of said side rails.

3. The vehicle article carrier of claim 1, wherein said locking means includes a manually adjustable thumbwheel member adapted to be rotated to releasably secure said cross rail means at desired positions along said at least one channel of said at least one bracket means and said side rails.

4. The vehicle article carrier of claim 1, wherein said one channel in said at least one of said bracket means curves downwardly from a position in communication with said channel of said side rail in a smooth, curving fashion to a position generally parallel and closely adjacent said outer body vehicle surface.

5. A vehicle article carrier comprising:

a pair of laterally spaced apart side rails extending longitudinally relative to an outer body surface of a vehicle;

each of said side rails including means for forming a channel therein extending longitudinally substantially the entire length of each said side rail;

each said side rail including a pair of brackets fixedly secured to said outer body surface of said vehicle to help support said side rails elevationally above said outer body surface;

a selected pair of said brackets each including a channel formed therein in communication with said channel of its associated side rail, said channels of each of said selected pair of brackets further extending downwardly to a position closely adjacent and generally parallel to said outer vehicle body surface;

at least one cross rail for supporting cargo extending perpendicularly between said side rails;

manually engageable locking means operatively associated with said cross rail for releasably locking said cross rail at desired positions along said side rails, said locking means including means for engaging within said channels of said selected pair of brackets and said channels of said side rails for clampingly securing said cross rail at said desired positions;

said channels of said selected pair of said brackets cooperating with said channels of said side rails to enable said cross rail and said locking means to be moved slidably, continuously along said channels of said side rails and said channels of said selected pair of said brackets between an operative position wherein said cross rail is positioned elevationally above said outer body vehicle surface and a stored position wherein said cross rail is positioned closely adjacent said outer body vehicle surface and between said pair of brackets.

6. The vehicle article carrier of claim 5, wherein said locking means comprises:

a thumbwheel member disposed for rotational movement within a cutout of said cross rail;

a threaded shaft fixedly secured to said thumbwheel such that rotational movement of said thumbwheel causes a corresponding rotation of said threaded shaft; and a locking nut disposed threadably on an end of said threaded shaft, said locking nut and a portion of said threaded shaft being disposed within said channel of said side rail and operable to move within said channel of said side rail and one channel of one of said selected pair of brackets between said operative and said stored positions.

7. The vehicle article carrier of claim 5, wherein said cross rail is aerodynamically shaped in the form of an air foil.

8. The vehicle article carrier of claim 5, wherein said channels in said selected pair of said brackets curve downwardly from said position of communication with said channels of said side rails in a smooth, curving fashion.

9. A vehicle article carrier comprising:

a pair of laterally spaced apart side rails extending longitudinally relative to an outer body surface of a vehicle;

each of said side rails including a channel formed therein and extending longitudinally along substantially the entire length of each of said side rails;

each said side rail including a pair of brackets at opposite ends thereof, each of said brackets being fixedly secured to said outer body surface to thereby help support said side rails elevationally above said outer body surface;

at least a pair of said brackets each including channels formed therein in communication with said channels of their respective side rails, said channels of each of said brackets further extending along said brackets in a gradually curving fashion to a position generally parallel to and closely adjacent said outer body surface;

a cross rail extending perpendicularly between said side rails;

a rotatable thumbwheel disposed within a cut-out portion of said cross rail and supported therein for rotational movement;

a threaded shaft secured to said thumbwheel such that rotational movement of said thumbwheel causes a corresponding rotational movement of said threaded shaft, said threaded shaft further being at least partially disposed within said channel of one of said side rails;

a locking nut threadably disposed on an end of said threaded shaft and within said channel of said one of said side rails, said locking nut being operable to be moved slidably in accordance with movement of said threaded shaft and said cross rail into said channels of said pair of brackets, said thumbwheel operating to draw said locking nut into clamping engagement with its associated channel when said thumbwheel is rotated in a first direction and to release said locking nut from clamping engagement with said side rail when said thumbwheel is rotated in a second direction opposite to said first direction;

said channels of said pair of said brackets and said channels of side rails cooperating to enable said cross rail to be moved slidably, longitudinally along said channels of said side rails and said channels of said pair of brackets between an operative position wherein said cross rail is supported elevationally above said outer body surface between said channels of said side rails, and a stored position wherein said cross rail is supported closely adjacent said outer body surface between said channels of said pair of said brackets.

* * * * *